(12) United States Patent
Ho

(10) Patent No.: US 7,780,245 B2
(45) Date of Patent: Aug. 24, 2010

(54) VALVE WITH INTEGRATED QUICK RELEASE

(75) Inventor: Thanh Ho, Brunswick, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 446 days.

(21) Appl. No.: 11/837,977

(22) Filed: Aug. 13, 2007

(65) Prior Publication Data
US 2009/0045671 A1 Feb. 19, 2009

(51) Int. Cl.
*B60T 8/34* (2006.01)
(52) U.S. Cl. .................. 303/119.2; 303/118.1
(58) Field of Classification Search ............. 303/37–39, 303/69–72, 118.1–119.2
See application file for complete search history.

(56) References Cited

U.S. PATENT DOCUMENTS

| | | | |
|---|---|---|---|
| 3,740,105 A * | 6/1973 | Holmes | 303/118.1 |
| 4,858,886 A | 8/1989 | Tatara | |
| 4,887,871 A | 12/1989 | McCann et al. | |
| 5,435,638 A | 7/1995 | Bayliss | |
| 5,722,740 A * | 3/1998 | Engelbert et al. | 303/118.1 |
| 6,209,971 B1 | 4/2001 | Ho et al. | |
| 6,247,764 B1 * | 6/2001 | Koelzer | 303/118.1 |
| 6,305,759 B1 | 10/2001 | Ho et al. | |
| 6,325,468 B1 | 12/2001 | Ho et al. | |
| 6,386,649 B1 | 5/2002 | Ross | |
| 6,415,818 B2 | 7/2002 | Dickman et al. | |
| 6,588,856 B2 * | 7/2003 | Herbst et al. | 303/119.2 |
| 7,077,481 B2 * | 7/2006 | Marsh et al. | 303/40 |
| 2004/0098189 A1 | 5/2004 | Howell et al. | |
| 2005/0137773 A1 * | 6/2005 | Goebels et al. | 701/78 |

FOREIGN PATENT DOCUMENTS

| | | |
|---|---|---|
| DE | 19640141 A1 | 4/1998 |
| EP | 0604864 A | 7/1994 |
| WO | 98/13239 | 4/1998 |

OTHER PUBLICATIONS

International Search Report for WO Application No. PCT/US2008/072288, dated Jan. 22, 2009.
Written Opinion of the International Searching Authority for WO Application No. PCT/US2008/072288, dated Jan. 22, 2009.
Bendix ATR-6 and ATR-3 Antilock Traction Relay Valves Service Data Sheet, Apr. 2008, All.
Bendix Service Data SD-03-1064, Bendix R-12 & R-14 Relay Valves, Mar. 2004.
Bendix Service Data SD-03-901, Bendix QRV and QR-1 Quick Release Valves, Mar. 2004.
Bendix Service Data SD-13-4811, Bendix ATR-1 AntiLock Traction Relay Valve, Oct. 2004.

* cited by examiner

*Primary Examiner*—Christopher P Schwartz
(74) *Attorney, Agent, or Firm*—Calfee, Halter & Griswold LLP

(57) ABSTRACT

A service brake/traction control valve includes a service brake control port, a traction control port, an exhaust port, and a control chamber. The control chamber fluidly communicates with the service brake control port and the traction control port as a function of a service brake event and as a function of a traction control event. The control chamber fluidly communicates with the exhaust port when the service brake event is released. The control chamber fluidly also communicates with the exhaust port when the traction control event is released.

30 Claims, 3 Drawing Sheets

VALVE WITH INTEGRATED QUICK RELEASE

BACKGROUND

The present invention relates to a braking valve for a heavy vehicle. It finds particular application in conjunction with a service/traction control valve integrating a quick release feature and will be described with particular reference thereto. It will be appreciated, however, that the invention is also amenable to other applications.

Heavy vehicles frequently include a traction control braking function. A service/traction valve is used for controlling air flow during both service brake and traction control functions. A service brake air control pressure is created when an operator depresses a service foot brake pedal. Upon release of the pedal, the service brake air control pressure must be exhausted according to times specified within certain federal guidelines. If the service brake air control pressure is exhausted via a valve located proximate to the pedal (instead of at the service/traction valve), the time required for the air control pressure to travel from the service/traction valve to the pedal may be significant, especially in vehicles having a long wheel base. Therefore, the release time of the service brake may be undesirably increased.

During a traction event, control air is quickly supplied to and exhausted from the service/traction valve to quickly apply and release the service brakes for gaining traction.

The present invention provides a new and improved apparatus and method which addresses the above-referenced problems.

SUMMARY

In one embodiment, a service brake/traction control valve includes a service brake control port, a traction control port, an exhaust port, and a control chamber. The control chamber fluidly communicates with the service brake control port and the traction control port as a function of a service brake event and as a function of a traction control event. The control chamber fluidly communicates with the exhaust port when the service brake event is released. The control chamber fluidly also communicates with the exhaust port when the traction control event is released.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
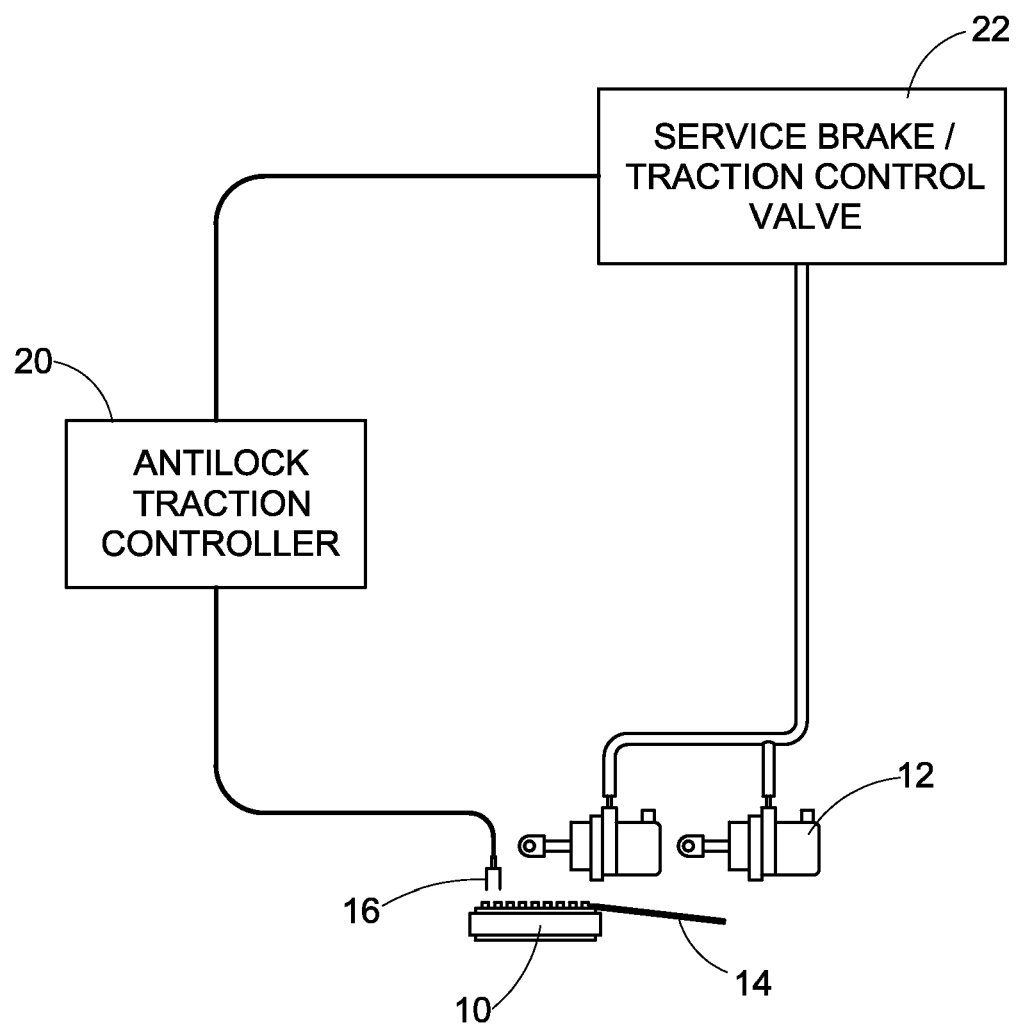
FIG. 1 illustrates a schematic representation of a simplified traction control braking system in accordance with one embodiment of an apparatus illustrating principles of the present invention.

With reference to FIG. 1, a vehicle includes at least one wheel 10 and at least one associated service brake 12. The wheel 10 includes a tone ring 14 and an associated wheel speed sensor 16. An antilock traction controller (ATC) 20, which includes an electronic control unit (ECU), detects a speed of the wheel 10 in conjunction with the wheel speed sensor 16 according to known methods. The ATC 20 is electrically connected to a service brake/traction control valve 22, which controls application of the service brake 12.

Figure 2:
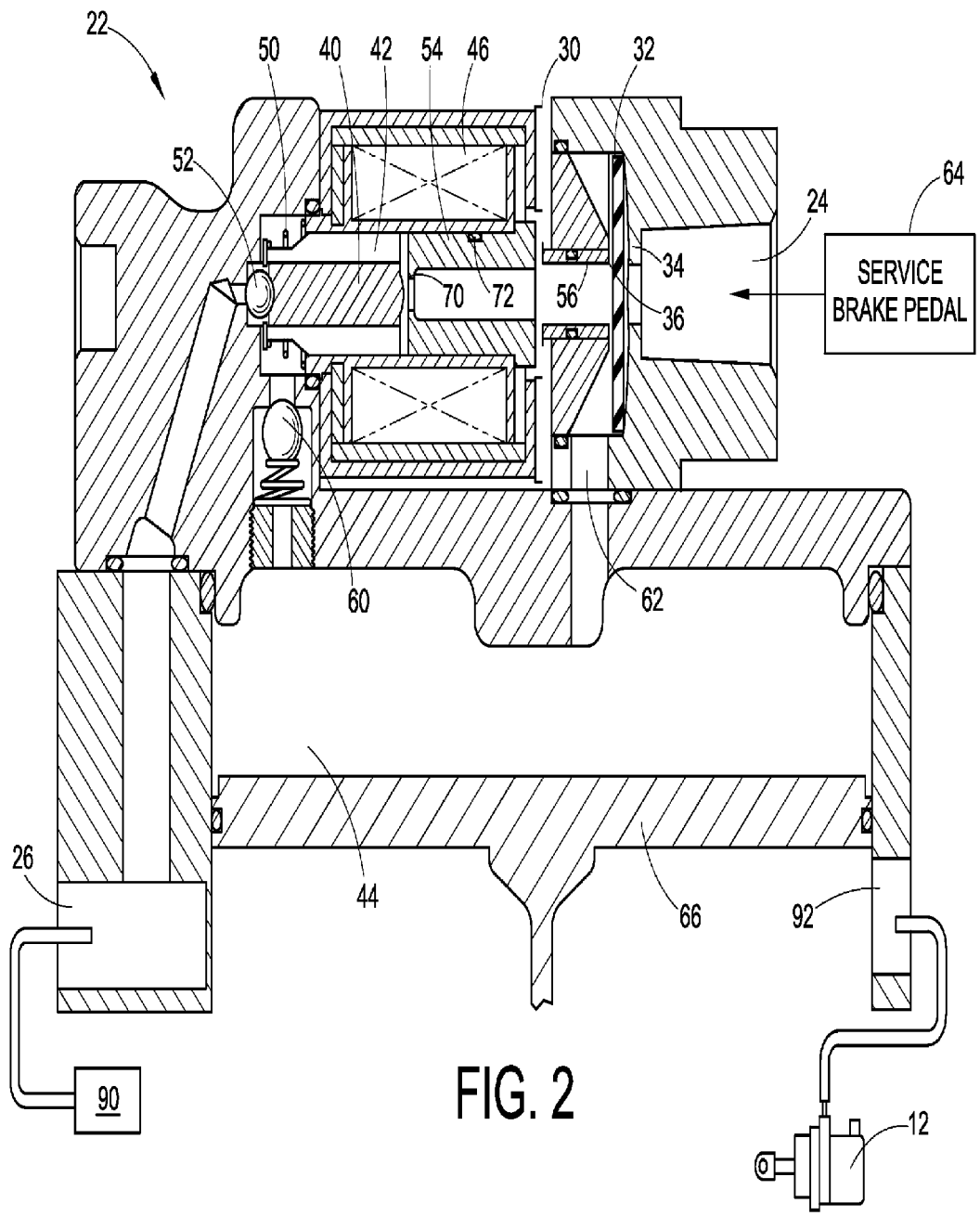
FIG. 2 illustrates a schematic representation of a simplified service brake/traction control valve in accordance with one embodiment of an apparatus illustrating principles of the present invention.

With reference to FIG. 2, a simplified diagram of the exemplary service brake/traction control valve 22 is illustrated in accordance with one embodiment of the present invention. The service brake/traction control valve 22 includes a service brake control port 24, a traction control port 26, and an exhaust port 30. The traction control port 26 is typically connected to a source of supply pressure, such as a reservoir 90. A diaphragm 32 is positioned within the service brake/traction control valve 22 and, more specifically, between an inlet seat 34 and exhaust seat 36.

A traction valve 40 is positioned within a traction valve passage 42 and controls fluid communication between the traction control port 26 and a control chamber 44. In one embodiment, the traction valve 40 is an armature of a solenoid valve, which also includes a winding 46. As discussed in more detail below, the traction valve 40 moves as a function of an electrical current passing through the winding 46. A spring 50 biases the traction valve 40 to a normally-closed position against a traction control port seat 52 for preventing fluid communication between the traction control port 26 and both the traction valve passage 42 and the control chamber 44. As discussed in more detail below, a pole piece 54 in the traction valve passage 42 interacts with the traction valve 40. In addition, a traction piston 56 in the traction valve passage 42 interacts with the pole piece 54 and the diaphragm 32.

The traction valve passage 42 fluidly communicates with the exhaust port 30 via a check valve 60, which is biased to permit fluid to flow from the traction control port 26 to the control chamber 44 but prevent fluid flowing from the control chamber 44 to the traction control port 26. The traction valve passage 42 also fluidly communicates with the control chamber 44 via a traction valve/control chamber passage 62 as a function of an interaction between the traction piston 56 and the diaphragm 32 and/or if the diaphragm 32 is sealed against the exhaust seat 36.

A service brake event occurs when the service brake 12 is actuated by, for example, an operator of an associated vehicle depressing a service brake pedal 64. During the service brake event, compressed fluid (e.g., air) passes from the service brake control port 24 toward the diaphragm 32. Pressure created by the flow of the compressed fluid seals the diaphragm 32 against the exhaust seat 36 and fluid communication is opened between the service brake control port 24 and the control chamber 44. As the compressed fluid builds pressure in the control chamber 44, a service brake control piston 66 moves for actuating the service brakes 12 through a delivery port 92 as is known in the art. The service brake event is released when, for example, the operator releases the service brake pedal 64.

When the service brake event is released, compressed fluid ceases to flow through the service brake control port 24 creating a relatively lower pressure in the service brake control port 24 than in the control chamber 44. The relatively higher pressure in the control chamber 44 unseats the diaphragm 32 from the exhaust seat 36 and, furthermore, seats the diaphragm 32 against the inlet seat 34 for creating a seal between the control chamber 44 and the service brake control port 24 and preventing the flow of fluid between the control chamber 44 and the service brake control port 24. At the same time, unseating the diaphragm 32 from the exhaust seat 36 permits fluid communication between the control chamber 44 and the exhaust port 30. The compressed fluid is exhausted from the control chamber 44 to, for example, atmosphere via the traction valve/control chamber passage 62 and the exhaust port 30.

The ATC 20 monitors application of the service brake pedal 64 and the vehicle's motion. When wheel spin is detected and the vehicle is stopped, or moving at any speed up to, for example, 25 mph, the ATC 20 transmits a traction control signal to the traction valve 40. A traction control event occurs when the traction control signal is transmitted to the traction valve 40.

During the traction control event, the traction control signal causes electrical current to pass through the winding 46, thereby causing the traction valve 40 to overcome the bias of the spring 50 and unseat the traction valve 40 from the normally-closed position at the traction control port seat 52. The traction valve 40 also moves to seal a normally-open armature seat 70 against the pole piece 54. As pressure builds in the traction valve passage 42, the check valve 60 is unseated to pass compressed fluid into the control chamber 44. In addition, as pressure continues to build behind a seal 72 (e.g., an o-ring) around the pole piece 54, the traction valve 40 and the pole piece 54 move toward the exhaust seat 36 and contacts the traction piston 56. The pressure causes the pole piece 54 to push the traction piston 56 into the diaphragm 32 until a seal is created between the diaphragm 32 and the traction piston 56 and until a seal is created between the diaphragm 32 and the inlet seat 34.

Once the seals are created between the diaphragm 32 and the traction piston 56, between the diaphragm 32 and the inlet seat 34, and between the traction valve 40 and the pole piece 54 (at the armature seat 70), the compressed fluid flows from the traction control port seat 52 to the control chamber 44 via the check valve 60. At the same time, the seals between the diaphragm 32 and the traction piston 56 and between the diaphragm 32 and the inlet seat 34 cause pressure to build in the control chamber 44. As discussed above, the service brake control piston 66 is moved—and the service brakes are applied—as pressure builds in the control chamber 44.

The traction control event is released when the traction control signal ceases to be transmitted from the ATC 20. When the traction control event is released, electrical current ceases to run through the winding 46. Consequently, the traction valve 40 returns to the biased, normally-closed sealed position against the traction control port seat 52. In addition, the pole piece 54 separates from the traction valve 40 and the traction piston 56. Therefore, the traction valve 40 is unsealed from the armature seat 70 and the pole piece 54 no longer moves the traction piston 56 into the diaphragm 32 so that seals are no longer created between the diaphragm 32 and the traction piston 56 or between the diaphragm 32 and the inlet seat 34. Consequently, fluid communication is prevented between the traction control port 26 and the traction valve passage 42; fluid communication is permitted between the traction valve passage 42 and the exhaust port 30 for exhausting the traction valve passage 42 to atmosphere; fluid communication is prevented between the traction valve passage 42 and the control chamber 44 (by the check valve 60); and fluid communication is permitted between the control chamber 44 and the exhaust port 30 for exhausting the control chamber 44 to atmosphere. In addition, fluid communications between the control chamber 44 and both the service brake control port 24 and the exhaust port 30 are controlled as a function of the relative pressures in the control chamber 44 and at the service brake control port 24. More specifically, when the traction control event is initially released, the pressure in the control chamber 44 is typically higher than the pressure at the service brake control port 24. Therefore, the diaphragm 32 is sealed against the inlet seat 34 and the control chamber 44 is exhausted to atmosphere via the traction valve/control chamber passage 62, the traction valve passage 42, and the exhaust port 30. Once the relative pressures in the control chamber 44 and the service brake control port 24 are substantially equal, the diaphragm 32 becomes unsealed from the inlet seat 34. Then, if a service brake event is initiated, the diaphragm 32 seals against the exhaust seat 36 and compressed fluid passes from the service brake control port 24 to the control chamber 44, as discussed above.

One advantage of exhausting the control chamber 44 via the exhaust port 30 in the service brake/traction control valve 22 is the service brakes are released relatively quicker than if the pressure in the control chamber 44 must travel to the service brake pedal valve via the service brake control port 24 to be exhausted. Therefore, the service brake/traction control valve 22 is considered to include an integrated quick-release for the service brakes.

Figure 3:
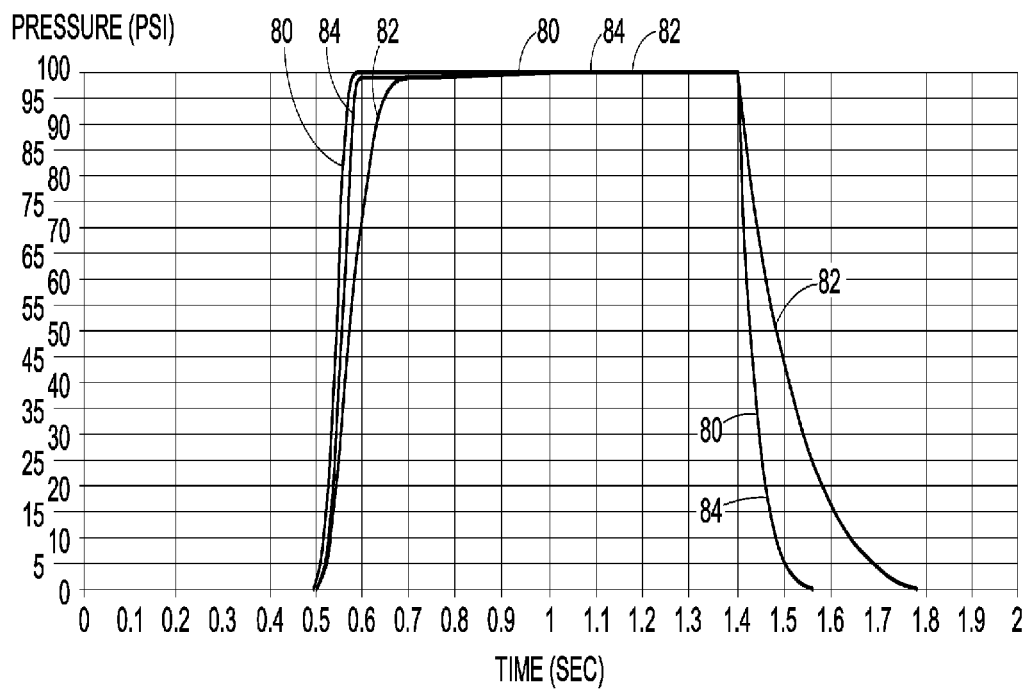
FIG. 3 illustrates graphs of service brake release times for various valves.

FIG. 3 illustrates a graphs showing service brake release times 80, 82, 84. The release time in the graph 80 is for the service brake/traction control valve described above. The release time in the graph 82 is for a valve similar to the service brake/traction control valve described above but which requires the control chamber to be exhausted by a valve at the service brake pedal. The release time in the graph 84 is for a valve similar to the valve described with reference to 82, but which attaches to a quick release valve for exhausting the control chamber. It is shown in FIG. 3 that the release times of the valves associated with the graphs 80, 84 are shorter than the release time of the valve associated with the graph 82. In this regard, the graphs 80, 84 substantially overlap, which indicates that the valves associated with the graphs 80, 84 have substantially the same release time.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A service brake/traction control valve, comprising:
   a service brake control port;
   a traction control port;
   an exhaust port;
   a control chamber fluidly communicating with the service brake control port and the traction control port as a function of a service brake event and as a function of a traction control event, the control chamber fluidly communicating with the exhaust port when the service brake event is released and the control chamber fluidly communicating with the exhaust port when the traction control event is released;
   a diaphragm between the service brake control port and both the exhaust port and the control chamber; and a traction piston selectively sealing the diaphragm for preventing fluid communication between the control chamber and the exhaust port during the traction control event, the diaphragm also preventing fluid communication between the control chamber and the service brake control port during the traction control event.

2. The service brake/traction control valve as set forth in claim 1, wherein: the control chamber fluidly communicates with the service brake control port during the service brake event; the control chamber does not fluidly communicate with the traction control port during the service brake event; and the control chamber fluidly communicates with the exhaust port when the service brake event is released.

3. The service brake/traction control valve as set forth in claim 2, wherein: the control chamber fluidly communicates with the traction control port during the traction control event; the control chamber does not fluidly communicate with the service brake control port during the traction control event; and the control chamber fluidly communicates with the exhaust port when the traction control event is released.

4. The service brake/traction control valve as set forth in claim 1, wherein: the traction piston is selectively unsealed from the diaphragm for permitting fluid communication between the control chamber and the exhaust port when the traction control event is released; and the diaphragm is set to prevent fluid communication between the control chamber and the service brake control port when the traction control event is released.

5. The service brake/traction control valve as set forth in claim 4, wherein: a pressure in the control chamber when the traction control event is released sets the diaphragm to prevent fluid communication between the control chamber and the service brake control port.

6. The service brake/traction control valve as set forth in claim 1, further including: a valve preventing fluid communication between the traction control port and the control chamber as a function of the traction control event.

7. The service brake/traction control valve as set forth in claim 6, wherein: the valve is a solenoid valve; the solenoid valve is energized to permit fluid communication between the traction control port and the control chamber during the traction control event; and the solenoid valve is de-energized to prevent fluid communication between the traction control port and the control chamber when the traction control event is released.

8. The service brake/traction control valve as set forth in claim 1, further including: an inlet seat between the service brake control port and the diaphragm, the diaphragm sealing with the inlet seat during the traction control event for preventing the fluid communication between the control chamber and the service brake control port.

9. A valve for controlling service brakes during both a service brake event and a traction control event, the valve comprising:
   a service brake control port;
   a traction control port;
   an exhaust port;
   a control chamber fluidly communicating with the traction control port as a function of the traction control event;
   a diaphragm between the service brake control port and both the exhaust port and the control chamber; and
   a traction piston positioned, as a function of the traction control event, to one of i) seal against the diaphragm for preventing fluid communication between the control chamber and both the exhaust port and service brake control port and ii) unseal from the diaphragm and permit fluid communication between the control chamber and at least one of the service brake control port and the exhaust port as a function of a position of the diaphragm.

10. The valve as set forth in claim 9, wherein: the control chamber fluidly communicates with the service brake control port during the service brake event; and the control chamber fluidly communicates with the exhaust port when the service brake event is released.

11. The valve as set forth in claim 10, wherein: the control chamber fluidly communicates with the traction control port during the traction control event; and the control chamber fluidly communicates with the exhaust port when the traction control event is released.

12. The valve as set forth in claim 11, wherein: the diaphragm is sealed against both the traction piston and an inlet seat during the traction control event for preventing fluid communication between the control chamber and both the service brake control port and the exhaust port; and the diaphragm is sealed against the inlet seat when the traction control event is released for preventing fluid communication between the control chamber and the service brake control port and also permitting fluid communication between the control chamber and the exhaust port.

13. The valve as set forth in claim 10, wherein: the diaphragm is sealed against an exhaust seat during the service brake event for preventing fluid communication between the control chamber and the exhaust port; and the diaphragm is sealed against an inlet seat when the service brake event is released for preventing fluid communication between the control chamber and the service brake control port and also permitting fluid communication between the control chamber and the exhaust port.

14. The valve as set forth in claim 9, wherein: service brake compressed fluid is fluidly transmitted from the service brake control port to the control chamber during the service brake event; and the service brake compressed fluid is fluidly transmitted from the control chamber to the exhaust port when the service brake event is released.

15. The valve as set forth in claim 14, wherein: traction control compressed fluid is fluidly transmitted from the traction control port to the control chamber during the traction control event; and the traction control compressed fluid is fluidly transmitted from the control chamber to the exhaust port when the fraction control event is released.

16. The valve as set forth in claim 9, further including: a solenoid energized for positioning the traction piston as a function of the traction control event.

17. The valve as set forth in claim 16, further including: a solenoid armature; wherein the solenoid armature is positioned to prevent fluid communication between the traction control port and the control chamber when the solenoid is not energized; and wherein the solenoid armature is positioned to permit fluid communication between the traction control port and the control chamber when the solenoid is energized.

18. A service brake/traction control valve, comprising:
   a service brake control port;
   a traction control port;
   an exhaust port;
   a control chamber fluidly communicating with the service brake control port and the traction control port as a function of a service brake event and as a function of a traction control event, the control chamber fluidly communicating with the exhaust port when the service brake event is released, and the control chamber fluidly communicating with the exhaust port when the traction control event is released;
   a diaphragm between the service brake control port and both the exhaust port and the control chamber;

a piston interacting with the diaphragm as a function of the traction control event; and a valve set during the traction control event to i) unseal the piston from the diaphragm to permit fluid communication between the traction control port and the control chamber and ii) seal the piston with the diaphragm to prevent fluid communication between the control chamber and the exhaust port, the diaphragm also preventing fluid communication between the control chamber and the service brake control port during the traction control event.

19. The service brake/traction control valve as set forth in claim 18, wherein: when the traction control event is released, the valve is set to i) prevent fluid communication between the traction control port and the control chamber and ii) unseal the piston from the diaphragm to permit fluid communication between the control chamber and the exhaust port; and when the piston is unsealed from the diaphragm, respective pressure differentials between the control chamber and both i) the service brake control port and ii) the exhaust port set the diaphragm for controlling fluid communication between the control chamber and both the service brake control port and the exhaust port.

20. The service brake/traction control valve as set forth in claim 19, wherein during the service brake event: the piston is unsealed from the diaphragm; the pressure differential between the service brake control port and the control chamber sets the diaphragm to permit fluid communication between the service brake control port and the control chamber; and the pressure differential between the service brake control port and the exhaust port sets the diaphragm to prevent fluid communication between the control chamber and the exhaust port.

21. The service brake/traction control valve as set forth in claim 20, wherein when the service brake event is released: the piston remains unsealed from the diaphragm; the pressure differential between the service brake control port and the control chamber sets the diaphragm to prevent fluid communication between the service brake control port and the control chamber; and the pressure differential between the service brake control port and the control chamber sets the diaphragm to permit fluid communication between the control chamber and the exhaust port.

22. The service brake/traction control valve as set forth in claim 21, further including: a check valve preventing fluid flowing from the control chamber to the traction control port.

23. The service brake/traction control valve as set forth in claim 21, wherein: the valve is a solenoid.

24. A service brake/traction control valve, comprising:
    a service brake control port;
    a traction control port;
    an exhaust port;
    a control chamber fluidly communicating with the service brake control port and the traction control port as a function of a service brake event and as a function of a traction control event, the control chamber fluidly communicating with the exhaust port when the service brake event is released, and the control chamber fluidly communicating with the exhaust port when the traction control event is released; and
    means for controlling the respective fluid communications between the control chamber and i) the service brake control port, ii) the traction control port, and iii) the exhaust port, wherein the means for controlling includes: a diaphragm between the service brake control port and both the exhaust port and the control chamber; a piston interacting with the diaphragm as a function of the traction control event; and a valve set during the traction control event to i) permit fluid communication between the traction control port and the control chamber and ii) seal the piston with the diaphragm to prevent fluid communication between the control chamber and the exhaust port, the diaphragm also preventing fluid communication between the control chamber and the service brake control port during the traction control event.

25. The service brake/traction control valve as set forth in claim 24, wherein: the valve is a solenoid.

26. A method for controlling a service brake/traction control valve, the method comprising:
    fluidly communicating between a control chamber and a service brake control port as a function of a service brake event and as a function of a traction control event;
    fluidly communicating between the control chamber and a traction control port as a function of the service brake event and as a function of the traction control event;
    fluidly communicating between the control chamber and an exhaust port when at least one of the service brake event is released and the traction control event is released; and
    selectively sealing the service brake control port, the exhaust port and the control chamber with a diaphragm for preventing fluid communication between the control chamber and the exhaust port during the traction control event and preventing fluid communication between the control chamber and the service brake control port during the traction control event, the diaphragm being acted upon by a traction piston.

27. The method for controlling a service brake/traction control valve as set forth in claim 26, further including during the service brake event: permitting fluid communication between the control chamber and the service brake port; preventing fluid communication between the control chamber and the traction control port; and preventing fluid communication between the control chamber and the exhaust port.

28. The method for controlling a service brake/traction control valve as set forth in claim 27, further including during the traction control event: permitting fluid communication between the control chamber and the traction control port.

29. The method for controlling a service brake/traction control valve as set forth in claim 28, further including when the traction control event is released: preventing fluid communication between the control chamber and the service brake port; preventing fluid communication between the control chamber and the traction control port; and permitting fluid communication between the control chamber and the exhaust port.

30. The method for controlling a service brake/traction control valve as set forth in claim 27, further including when the service brake event is released: preventing fluid communication between the control chamber and the service brake port; preventing fluid communication between the control chamber and the traction control port; and permitting fluid communication between the control chamber and the exhaust port.

* * * * *